(12) United States Patent
Zipprich et al.

(10) Patent No.: US 11,225,237 B2
(45) Date of Patent: Jan. 18, 2022

(54) CONTROL DEVICE AND METHOD FOR OPERATING AN ELECTROMECHANICAL BRAKE BOOSTER OF A VEHICLE

(71) Applicant: Robert Bosch GmbH, Stuttgart (DE)

(72) Inventors: Dominic Zipprich, Beilstein (DE); Benno Schmieg, Gerlingen (DE); Rafael Gonzalez Romero, Ilsfeld-Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 16/613,473

(22) PCT Filed: Mar. 22, 2018

(86) PCT No.: PCT/EP2018/057306
§ 371 (c)(1),
(2) Date: Nov. 14, 2019

(87) PCT Pub. No.: WO2018/215118
PCT Pub. Date: Nov. 29, 2018

(65) Prior Publication Data
US 2021/0078558 A1     Mar. 18, 2021

(30) Foreign Application Priority Data

May 23, 2017   (DE) .......................... 102017208685.8

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 8/4077* (2013.01); *B60T 13/686* (2013.01);
(Continued)

(58) Field of Classification Search
CPC .... B60T 13/74; B60T 13/745; B60T 2201/12; B60T 7/042
See application file for complete search history.

(56) References Cited

U.S. PATENT DOCUMENTS

| | | | |
|---|---|---|---|
| 10,005,441 B2 * | 6/2018 | Matsunaga | ........... B60T 13/745 |
| 2008/0302100 A1 * | 12/2008 | Ohtani | .................. B60T 13/745 |
| | | | 60/545 |

(Continued)

FOREIGN PATENT DOCUMENTS

| | | |
|---|---|---|
| CN | 103826947 A | 5/2014 |
| CN | 104093610 A | 10/2014 |

(Continued)

OTHER PUBLICATIONS

International Search Report for PCT/EP2018/057306, dated Jul. 6, 2018.

*Primary Examiner* — Bradley T King
(74) *Attorney, Agent, or Firm* — Norton Rose Fulbright Us LLP; Gerard Messina

(57) ABSTRACT

A control apparatus for an electromechanical-brake-booster of a vehicle, having: an electronic-device to control an electric-motor of the electromechanical-brake-booster so that an output piston, connected indirectly to the electric-motor, of the electromechanical-brake-booster is displaceable out of its initial-position by the controlled electric-motor, such that only after a displacement of the output-piston out of its initial-position by at least a predefined limit displacement travel does a frictional engagement exist between the output-piston and an input-piston that is indirectly connected to the brake-pedal and is displaced by the actuation of the brake-pedal, and such that a speed of the output-piston displaced out of its initial-position by less than the limit displacement travel is at first increased from a reference-speed to a maximum-speed and is then reduced (Continued)

from the maximum-speed to the reference-speed. The invention furthermore relates to a method for operating an electromechanical-brake-booster of a vehicle.

11 Claims, 5 Drawing Sheets

(51) Int. Cl.
    *B60T 8/40*         (2006.01)
    *B60T 13/68*      (2006.01)

(52) U.S. Cl.
    CPC ..... *B60T 2220/04* (2013.01); *B60T 2270/604* (2013.01); *B60Y 2400/81* (2013.01)

(56) References Cited

U.S. PATENT DOCUMENTS

| | | | | |
|---|---|---|---|---|
| 2011/0314806 A1* | 12/2011 | Ishizuka | ............... | B60T 13/745 60/545 |
| 2013/0025273 A1* | 1/2013 | Nozawa | ............... | B60T 13/686 60/545 |
| 2013/0269337 A1* | 10/2013 | Mahnkopf | ................ | B60T 7/12 60/533 |
| 2013/0305706 A1* | 11/2013 | Mahnkopf | .............. | B60T 17/22 60/533 |
| 2015/0046053 A1 | 2/2015 | Gerdes et al. | | |
| 2015/0360663 A1* | 12/2015 | Svensson | ................ | B60T 8/171 701/70 |
| 2017/0066419 A1* | 3/2017 | Baehrle-Miller | ....... | B60T 8/171 |

FOREIGN PATENT DOCUMENTS

| | | |
|---|---|---|
| CN | 105270371 A | 1/2016 |
| CN | 106232441 A | 12/2016 |
| CN | 109641573 A | 4/2019 |
| CN | 110366511 A | 10/2019 |
| DE | 102006020303 A1 | 11/2007 |
| DE | 102012203698 | 9/2013 |
| DE | 102015219303 | 4/2017 |
| EP | 2778000 | 9/2014 |
| JP | 2012512781 | 6/2012 |
| JP | 2012523991 | 10/2012 |

* cited by examiner

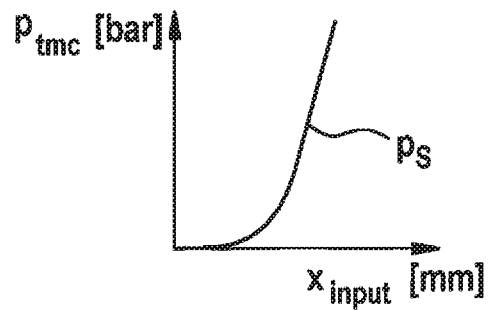
(EXISTING ART) Fig. 1a
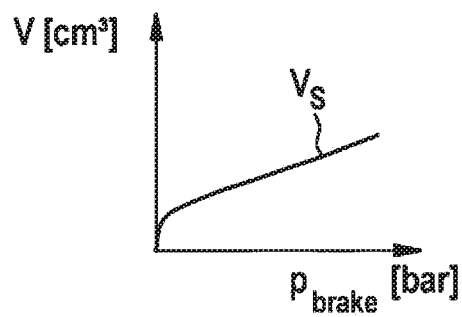
(EXISTING ART) Fig. 1b
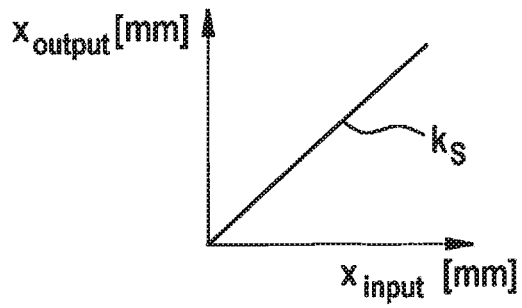
(EXISTING ART) Fig. 1c

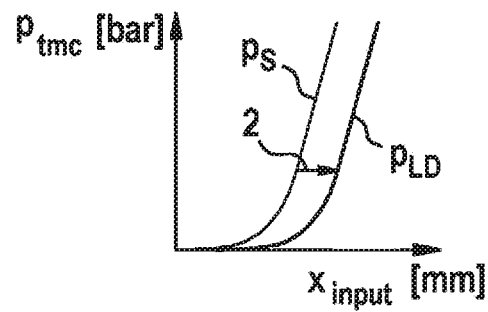
(EXISTING ART) Fig. 1d
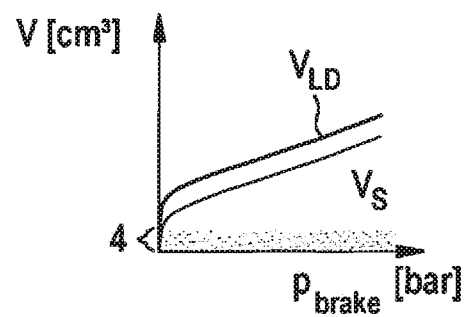
(EXISTING ART) Fig. 1e
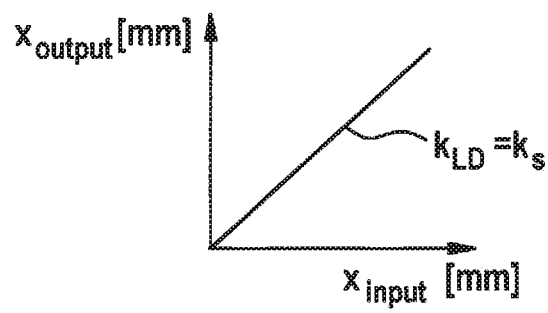
(EXISTING ART) Fig. 1f

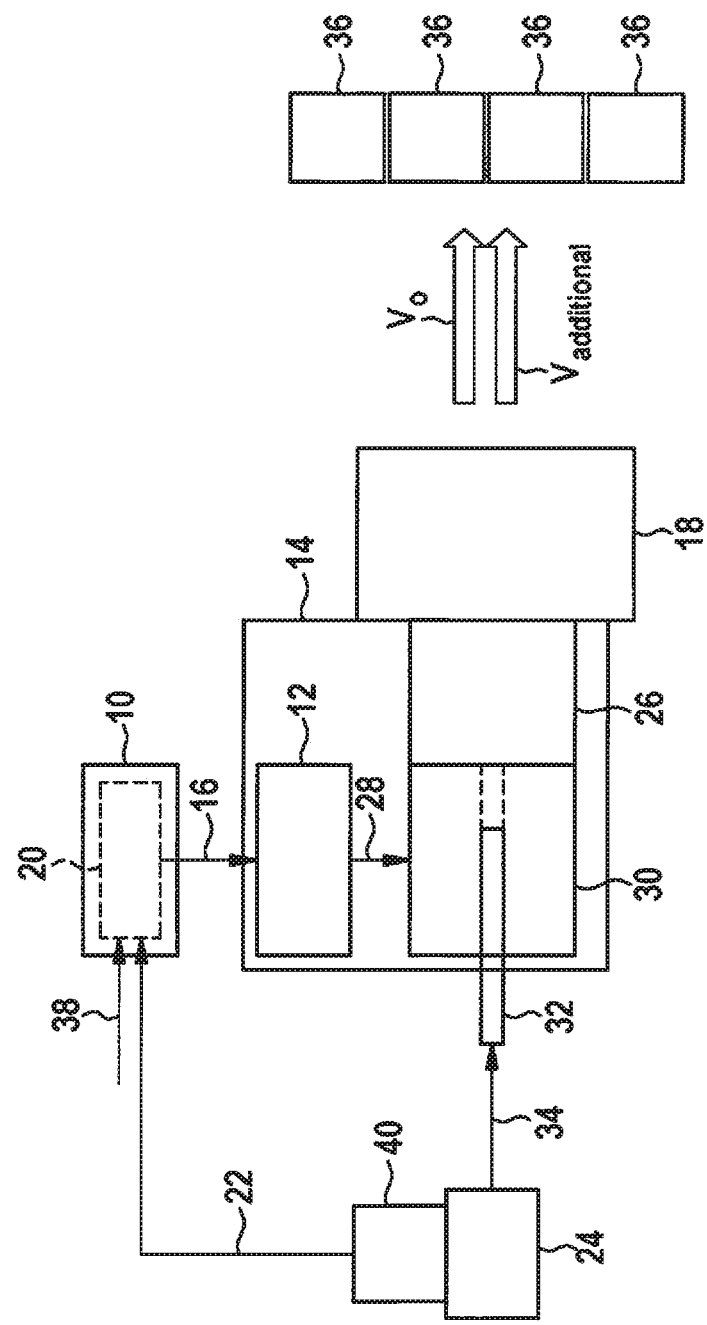

CONTROL DEVICE AND METHOD FOR OPERATING AN ELECTROMECHANICAL BRAKE BOOSTER OF A VEHICLE

FIELD OF THE INVENTION

The present invention relates to a control apparatus for an electromechanical brake booster of a vehicle. The invention also relates to an electromechanical brake booster for a vehicle, and to a hydraulic braking system for a vehicle. The present invention furthermore relates to a method for operating an electromechanical brake booster of a vehicle.

BACKGROUND INFORMATION

The existing art is understood to refer to floating calipers having a wheel brake cylinder, which are referred to hereinafter as floating caliper wheel brake cylinders. With a floating caliper wheel brake cylinder, at least one brake pad, in its unactuated position, is never pushed entirely back into the associated floating caliper, and thus still generates a residual drag torque (or residual braking torque) on an associated rotating brake disk even when a vehicle or motor vehicle equipped therewith is traveling in an unbraked state. Because the residual drag torque is directed oppositely to a drive torque of the vehicle or motor vehicle that is traveling in an unbraked manner, it contributes to an increase in fuel consumption (and possibly pollutant emissions) even when the vehicle or motor vehicle is maintaining a constant speed.

Also from the existing art are believed to be reduced-resistance brake calipers or low-drag calipers having a wheel brake cylinder, which are referred to hereinafter as a low drag wheel brake cylinder. In a low drag wheel brake cylinder, the at least one brake pad exhibits in its unactuated position a larger air gap (as compared with a floating caliper wheel brake cylinder) with respect to the associated rotating brake disk. This minimizes the residual drag torque or residual braking torque of the low drag wheel brake cylinder, and thus also energy consumption or fuel consumption (and possible also pollutant emissions) in an unactuated state.

FIGS. 1a to 1f show coordinate systems to explain response times of conventional wheel brake cylinders, the coordinate systems of FIGS. 1a to 1c reproducing a standard floating caliper wheel brake cylinder, and the coordinate systems of FIGS. 1d to 1f reproducing a standard low drag wheel brake cylinder. In the coordinate systems of FIGS. 1a and 1d, the abscissas indicate an input rod travel $x_{input}$ (in millimeters) of an input rod of a hydraulic braking system interacting with the respective wheel brake cylinder, while the ordinates of the coordinate systems of FIGS. 1a and 1d reproduce a brake master cylinder pressure $p_{tmc}$ in FIG. 1a (in bars) in a brake master cylinder of the respective hydraulic braking system. The abscissas of the coordinate systems of FIGS. 1b and 1e indicate a brake pressure $p_{brake}$ (in bars) in the respective wheel brake cylinders of the respective hydraulic braking system, the brake fluid volume (in cm³) to be displaced for that purpose out of the associated brake master cylinder into the wheel brake cylinders being indicated by the ordinates of the coordinate systems of FIGS. 1b and 1e. In the coordinate systems of FIGS. 1c and 1f as well, the abscissas indicate the input rod travel $x_{input}$ (in millimeters) of the respective input rod, while the ordinates of the coordinate systems of FIGS. 1c and 1f indicate an output rod travel $x_{output}$ (in millimeters) of an interacting output rod of the respective hydraulic braking system.

A ratio $p_s$ between the actuated input rod travel $x_{input}$ and the brake master cylinder $p_{tmc}$ of the conventional floating caliper wheel brake cylinder thereby brought about (FIG. 1a) and a ratio $p_{LD}$ between the actuated input rod travel $x_{input}$ and the brake master cylinder pressure $p_{tmc}$ of the conventional low drag wheel brake cylinder thereby brought about (FIG. 1d) deviate from one another, so that in order to bring about a specific brake master cylinder pressure $p_{tmc}$ a driver must actuate a longer brake stroke at his or her brake pedal in the case of the conventional low drag wheel brake cylinder, as depicted by an arrow 2. As compared with the floating caliper wheel brake cylinder, the low drag wheel brake cylinder exhibits a longer response time upon deceleration or braking of a vehicle or motor vehicle equipped therewith.

It is also apparent from a comparison of FIGS. 1b and 1e that a ratio $V_s$ between the brake pressure $p_{brake}$ in the floating caliper wheel brake cylinder and the brake fluid volume V to be introduced for that purpose (FIG. 1b), and a ratio $V_{LD}$ between the brake pressure $p_{brake}$ in the low drag wheel brake cylinder and the brake fluid volume V to be introduced for that purpose (FIG. 1e) differ from one another. An additional volume 4 to be introduced additionally into the low drag wheel brake cylinder in order to bring about a specific brake pressure $p_{brake}$ (as compared with the floating caliper wheel brake cylinder) is also depicted in the coordinate system of FIG. 1e. Closing the larger air gap of the low drag wheel brake cylinder thus requires more brake volume.

The coordinate systems of FIGS. 1c and 1d depict a pedal characteristic curve $k_s$ of the hydraulic braking system equipped with the floating caliper wheel brake cylinder and a pedal characteristic curve $k_{LD}$ of the hydraulic braking system equipped with the low drag wheel brake cylinder. It is evident that pedal characteristic curves $k_s$ and $k_{LD}$ correspond to one another.

In order to avoid an extended response time for a conventional hydraulic vehicle braking system having low drag wheel brake cylinders, and delayed deceleration of a vehicle equipped therewith, DE 10 2008 054 856 A1 refers to a method in which a brake booster is already actuated upon a possible braking input, in such a way that an air gap in the low drag wheel brake cylinders is decreased, which may be eliminated. The possible braking input is said to be detectable on the basis of a (rapid) release of an accelerator pedal, a (rapid) approach of a driver's foot toward a brake pedal, or a decrease below a minimum value of a distance to a preceding vehicle or to an obstacle.

DISCLOSURE OF THE INVENTION

The present invention creates a control apparatus, having the features described herein, for an electromechanical brake booster of a vehicle; an electromechanical brake booster, having the features described herein, for a vehicle; a hydraulic braking system, having the features described herein, for a vehicle; and a method, having the features described herein, for operating an electromechanical brake booster of a vehicle.

The present invention makes possible operation of an electromechanical brake booster, in a braking system equipped with low drag wheel brake cylinders, in such a way that upon deceleration or braking of a vehicle or motor vehicle embodied therewith, a response time of the low drag wheel brake cylinders is (substantially) identical to a response time of conventional floating caliper wheel brake cylinders. Operation according to the present invention of the electromechanical brake booster brings about a compensation for the air gaps of the low drag wheel brake cylinders and at the same time a brake actuation feel or brake pedal feel that appears to a driver to be identical to a conventional brake actuation feel or brake pedal feel of a conventional braking system having conventional floating caliper wheel brake cylinders. The present invention thus brings about greater acceptance of low drag wheel brake cylinder by drivers, with the result that they can be inspired to use this fuel-saving and emissions-reducing type of wheel brake cylinder. The present invention thus also contributes to a reduction in fuel consumption and/or in pollutant emissions in the context of driving.

An essential advantage of the present invention in accordance with the existing art explained above is that the air gap compensation achievable therewith does not require any detection of a possible braking input or any reaction, by the electromechanical brake booster being used, to the possible braking input early on and before an actually requested braking operation begins. When the present invention is used it is therefore possible to dispense with equipping the respective vehicle or motor vehicle with a sensor system for ascertaining possible braking inputs. Energy consumption can also be reduced by way of the present invention, because the electromechanical brake booster does not react early on to a possible braking input.

A further essential advantage of the present invention is that air gap compensation can be executed according to the present invention before frictional engagement between the output piston and the input piston exists. The driver who is actuating the brake pedal thus does not perceive the air gap compensation. Air gap compensation can thus be combined with a conventional or standard brake actuation feel or brake pedal feel for the driver when requesting deceleration or braking of his or her vehicle or motor vehicle.

In an advantageous embodiment of the control apparatus, the electronic device is additionally configured to specify the maximum speed at least in consideration of a furnished vehicle speed signal regarding a current speed of the vehicle. In this case, the higher the current speed of the vehicle, the shorter the time interval for the execution of air gap compensation may become, thanks to an increase in the speed of the displaced output piston starting from the reference speed to the maximum speed, and the subsequent reduction of the speed from the maximum speed to the reference speed. Air gap compensation can thus also be performed more quickly when the vehicle is traveling comparatively quickly.

As an alternative or supplement thereto, the electronic device can additionally be configured to specify the maximum speed at least in consideration of a braking dynamics signal regarding a dynamics of the actuation of the brake pedal by the driver. In this case, the more dynamic the actuation of the brake pedal by the driver, the shorter the time interval for executing the air gap compensation can be specified to be. Air gap compensation can thus also occur relatively quickly in response to a highly dynamic actuation of the brake pedal, for example a relatively rapid actuation of the brake pedal.

The advantages described above are also ensured in the context of an electromechanical brake booster for a vehicle which is placeable or placed upstream from a brake master cylinder of a hydraulic braking system and is equipped with a corresponding control apparatus. The electromechanical brake booster can be refined in accordance with the above-described embodiments of the control apparatus.

A hydraulic braking system for a vehicle, having a control apparatus of this kind and an interacting electromechanical brake booster or the above-described electromechanical brake booster, the respective electromechanical brake booster being placed upstream from a brake master cylinder of the hydraulic braking system, also produces the above-described advantages. The hydraulic braking system as well can be refined in accordance with the embodiments of the control apparatus which are explained above.

The hydraulic braking system can encompass, in particular, four wheel brake cylinders, a time interval within which the speed of the output piston, displaced out of its initial position by less than the limit displacement travel, is firstly increased from the reference speed to the maximum speed and then reduced from the maximum speed to the reference speed, being specified so that a brake fluid volume additionally displaced out of the brake master cylinder into the wheel brake cylinders as a result of the effected elevation of the speed above the reference speed is sufficient to close the air gaps of the four wheel brake cylinders. The braking system described here is thus optimized in terms of air gap compensation according to the present invention.

The four wheel brake cylinders may be each embodied with a reduced-resistance brake caliper or a low drag caliper. It is thereby possible to make use of the fact that operation according to the present invention of the electromechanical brake booster is optimized specifically for that type of wheel brake cylinder.

The advantages already described above are furthermore also created by a corresponding method for operating an electromechanical brake booster of a vehicle. It is expressly noted that the method as well can be refined in accordance with the above-described embodiments of the control apparatus, of the electromechanical brake booster, and/or of the hydraulic braking system.

Further features and advantages of the present invention will be explained below with reference to the Figures.

BRIEF DESCRIPTION OF THE DRAWINGS

FIGS. 1a to 1f depict coordinate systems to explain response times of conventional wheel brake cylinders, a standard floating caliper wheel brake cylinder being reproduced by the coordinate systems of FIGS. 1a to 1c, and a standard low drag wheel brake cylinder being reproduced by the coordinate systems of FIGS. 1d to 1f.

FIGS. 2a and 2b schematically depict a first embodiment of the control apparatus and a coordinate system to explain its manner of operation.

DETAILED DESCRIPTION

Figure 2B:
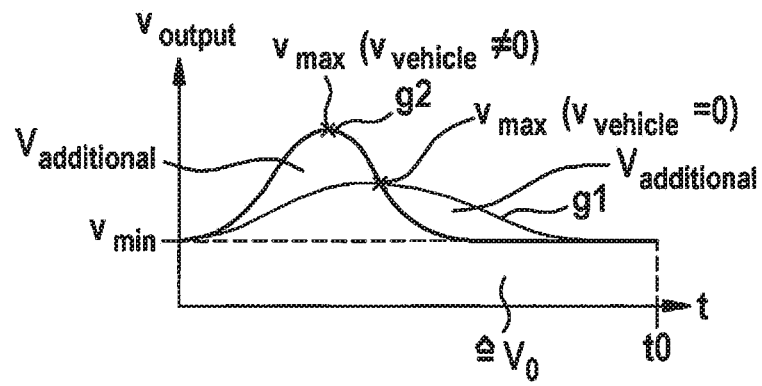

FIGS. 2a and 2b schematically depict a first embodiment of the control apparatus and a coordinate system to explain its manner of operation.

Control apparatus 10 that is schematically depicted in FIG. 2a is configured to control an electric motor 12 of an electromechanical brake booster 14 of a vehicle or motor vehicle by way of at least one control signal 16. The "electromechanical brake booster" 14 is to be understood as a type of brake booster that is placed or placeable upstream from a brake master cylinder 18 of a hydraulic braking system of the respective vehicle or motor vehicle. Control apparatus 10 can be embodied as a dedicated component (i.e. separately from electromechanical brake booster 14). Alternatively, "control apparatus 10" can be understood as a sub-unit of electromechanical brake booster 14. A usability of control apparatus 10 or of electromechanical brake booster 14 embodied therewith is not limited either to a specific brake system type of the hydraulic braking system or to a specific vehicle or motor vehicle type of the vehicle or motor vehicle.

Control apparatus 10 has an electronic device 20 that is configured to control electric motor 12 of electromechanical brake booster 14 in consideration at least of a furnished braking definition signal 22 with regard to an actuation of a brake pedal 24 of the vehicle or motor vehicle by its driver. Electric motor 12 is controlled, in consideration at least of braking definition signal 22, in such a way that an output piston 26, connected indirectly to electric motor 12, of electromechanical brake booster 14 is displaceable or displaced out of its initial position by way of the controlled electric motor 12. The controlled electric motor 12 exerts, for example, a motor force 28 on a valve body 30 of electromechanical brake booster 14 in such a way that valve body 30 becomes displaced, with the result that the contacted or impacted output piston 26 also becomes displaced by motor force 28. Be it noted, however, that a range of embodiment of electromechanical brake booster 14 is not limited to its being equipped with valve body 30.

Electronic device 20 is configured to control electric motor 12 in such a way that it is only after a displacement of output piston 26 out of its initial position by at least a predefined limit displacement travel that a frictional engagement exists between output piston 26 and an input piston 32 that is indirectly connected to brake pedal 24 and is displaced by way of the actuation of brake pedal 24. Input piston 32 can be disposed indirectly on brake pedal 24 in such a way that a driver braking force 34 is transferrable from brake pedal 24 to input piston 32. For better clarity, only components 12, 26, 30, and 32 of electromechanical brake booster 14 are depicted in FIG. 2a. It is nevertheless expressly noted that electromechanical brake booster 14 can also have all other conventional components of that type of brake booster.

By way of a gap or takeup distance between input piston 32 and output piston 26 (or a reaction disk upstream from output piston 26) it is possible to ensure that no frictional engagement exists between output piston 26 and input piston 32 until output piston 26 has been displaced out of its initial position by at least the limit displacement travel (or until input piston 32 has been displaced over a corresponding "jump-in" region). The driver who is actuating brake pedal 24 thus, despite a frictional engagement between output piston 26 and at least one displaceable piston of brake master cylinder 18, does not perceive a brake master cylinder pressure existing in brake master cylinder 18 until the jump-in region or limit displacement travel has been exceeded.

Electronic device 20 is furthermore configured to control electric motor 12, during a displacement of output piston 26 out of its initial position to the limit displacement travel, in such a way that a speed $v_{output}$ of output piston 26 displaced out of its initial position by less than the limit displacement travel is at first increased from a reference speed $v_{min}$ predefined by way of a pedal speed of brake pedal 24 to a predefined or specified maximum speed $v_{max}$, and then (while output piston 26 is still being displaced out of its initial position to the limit displacement travel) is or becomes reduced from the maximum speed $v_{max}$ to the reference speed $v_{min}$. This is reproduced schematically by way of the coordinate system of FIG. 2b, where an abscissa of the coordinate system is a time axis t and an ordinate of the coordinate system indicates the speed $v_{output}$ of output piston 26. It is apparent that by way of the brief increase in the speed $v_{output}$ of output piston 26 above the reference speed $v_{min}$, an additional brake fluid volume $V_{additional}$ (in addition to a baseline brake fluid volume $V_0$ displaced by maintaining the reference speed $v_{min}$) becomes displaced into wheel brake cylinders 36 of the hydraulic braking system. (The baseline brake fluid volume $V_0$ corresponds to an area under the line $v_{min}$ up to a time t0 from which a frictional engagement exists between output piston 26 and input piston 32. The additional brake fluid volume $V_{additional}$ corresponds to an area enclosed between the line $v_{min}$ and the graph line g1, or an area enclosed between the line $v_{min}$ and the graph line g2.)

The additional brake fluid volume $V_{additional}$ makes possible an air gap compensation, brought about (automatically) by electromechanical brake booster 14, in wheel brake cylinders 36. The operating mode of electromechanical brake booster 14 which is described here thus takes into account a priori an air gap of wheel brake cylinders 36, and automatically compensates for it. In that context, electric motor 12 is already moving output piston 26, at the beginning of a braking operation, with a faster superimposed motion. This faster superimposed motion takes place within the jump-in region, i.e. before input piston 32, actuated by the driver, is in frictional engagement with output piston 26. The air gap compensation is therefore not perceptible by the driver during actuation of brake pedal 24.

The speed $v_{output}$ of output piston 26 transitions to the reference speed $v_{min}$ even before the frictional engagement between input piston 32 and output piston 26. Electromechanical brake booster 14 thus behaves in a standard manner as soon as frictional engagement exists between input piston 32 and output piston 26.

The reference speed $v_{min}$ may be specified or predefined, in accordance with a predefined relationship or function, by the pedal speed of brake pedal 24 (or by a speed of input piston 32). The reference speed $v_{min}$ can be or become specified by control apparatus 10, for example, in consideration of braking definition signal 22 that is furnished.

In the embodiment of FIGS. 2a and 2b, electronic device 20 is additionally configured to specify the maximum speed $v_{max}$ at least in consideration of a furnished vehicle speed signal 38 regarding a current speed $v_{vehicle}$ of the vehicle. Electric motor 12 is thus controlled in a situation-dependent manner. The faster the vehicle is traveling, the higher the maximum speed $v_{max}$ that may be selected.

In the example of FIGS. 2a and 2b, the graph line g1 reproduces the speed $v_{output}$ when the vehicle is at a standstill ($v_{vehicle}=0$). The graph line g2, conversely, reproduces the speed $v_{output}$ when the vehicle or motor vehicle is being driven ($v_{vehicle}\neq 0$). Air gap compensation is thus carried out less dynamically when the vehicle is at a standstill than while the vehicle or motor vehicle is being driven. This is advantageous because when a vehicle is at a standstill, the "braking effect" is less important to the driver than good pedal feel, while the braking effect produced on the vehicle or motor vehicle that is being driven is, as a rule, more important to the driver than good pedal feel.

Braking definition signal 22 can be furnished by sensing a position of input piston 32 and/or by sensing a speed of input piston 32. At least one sensor 40, for example a pedal sensor, a pedal angle sensor, a pedal speed sensor, a pedal angle/speed sensor, a rod travel sensor, a travel difference sensor, a force measurement sensor, and/or a motor position sensor, can be used to sense a position of input piston 32 and/or the speed of input piston 32. Sensor types already installed on a vehicle or motor vehicle can thus, as a rule, be used in order to furnish the braking definition signal 22.

Figure 3:
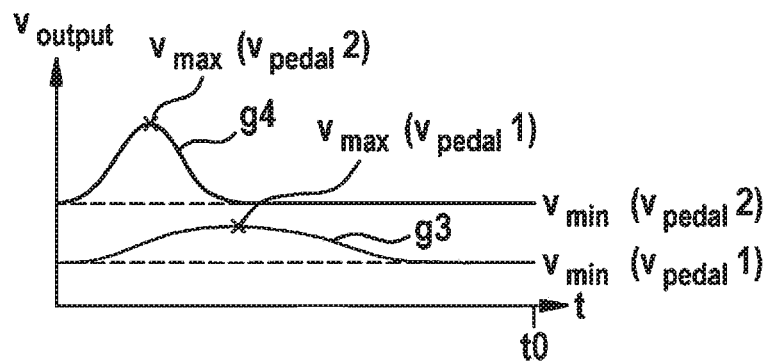
FIG. 3 shows a coordinate system to explain a manner of operation of a second embodiment of the control apparatus.

FIG. 3 shows a coordinate system to explain a manner of operation of a second embodiment of the control apparatus. In the coordinate system of FIG. 3, an abscissa indicates the time axis t while an ordinate indicates the speed $v_{output}$ of output piston 26.

As a refinement of or an alternative to the embodiment previously described, the control apparatus reproduced by way of the coordinate system of FIG. 3 is configured to specify the maximum speed $v_{max}$ at least in consideration of a braking dynamics signal regarding a dynamics of the actuation of the brake pedal by the driver. The at least one sensor for sensing a position of the input piston and/or the speed of the input piston, for example a pedal sensor, a pedal angle sensor, a pedal speed sensor, a pedal angle/speed sensor, a rod travel sensor, a travel difference sensor, a force measurement sensor, and/or a motor position sensor, can again be utilized to furnish the braking dynamics signal. Air gap compensation may be carried out more quickly in a context of highly dynamic actuations of the brake pedal than with less-dynamic actuations of the brake pedal. This is advantageous because a highly dynamic actuation of the brake pedal indicates that the driver wishes to decelerate his or her vehicle as quickly as possible, even if his or her pedal feel in that context is unusual. Optionally, the reference speed $v_{min}$ can also be specified in consideration of the braking dynamics signal.

In the example of FIG. 3 having graph lines g3 and g4, the maximum speed $v_{max}$ and the reference speed $v_{min}$ are specified in consideration of an entry speed $v_{pedal}$ of the driver onto the brake pedal (constituting a variable of the braking dynamics signal which reproduces the dynamics of the actuation of the brake pedal). The higher the entry speed $v_{pedal}$, the higher the maximum speed $v_{max}$ (and, optionally, also the reference speed $v_{min}$). (The entry speed $v_{pedal}2$ is higher than the entry speed $v_{pedal}1$.) Specifying the maximum speed $v_{max}$ (and optionally also the reference speed $v_{min}$) in consideration of the entry speed $v_{pedal}$ ensures optimum compensation for the air gap during driving operation, and a familiar or standard pedal feel.

The advantages of the control apparatuses explained above are also possessed by an electromechanical brake booster for a vehicle which is placeable or placed upstream from a brake master cylinder of a hydraulic braking system and is embodied with a control apparatus of that kind. The advantages explained above are likewise brought about by a hydraulic braking system for a vehicle having a corresponding control apparatus and an interacting electromechanical brake booster or having an electromechanical brake booster embodied with a control apparatus of that kind, the respective electromechanical brake booster being placed upstream from a brake master cylinder of the hydraulic braking system. The hydraulic braking system may encompass four wheel brake cylinders, a time interval within which the speed of the output piston, displaced out of its initial position by than the limit displacement travel, is firstly increased from the reference speed to the maximum speed and then reduced from the maximum speed to the reference speed, being specified so that a brake fluid volume additionally displaced, as a result of the effected elevation of the speed above the reference speed, out of the brake master cylinder into the wheel brake cylinders is sufficient to close the air gaps of the four wheel brake cylinders. In this case the four wheel brake cylinders may be each embodied with a reduced-resistance brake caliper or with a low drag brake caliper.

Figure 4A:
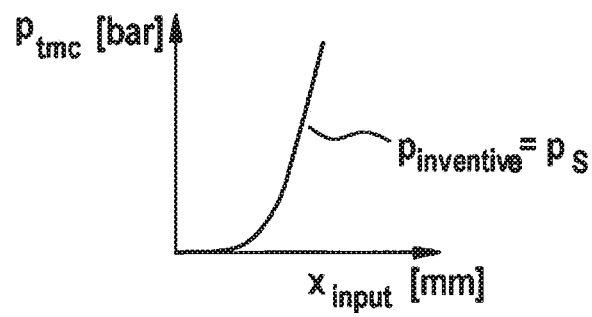
FIGS. 4a to 4c show coordinate systems to explain an embodiment of the method for operating an electromechanical brake booster of a vehicle.
Figure 4B:
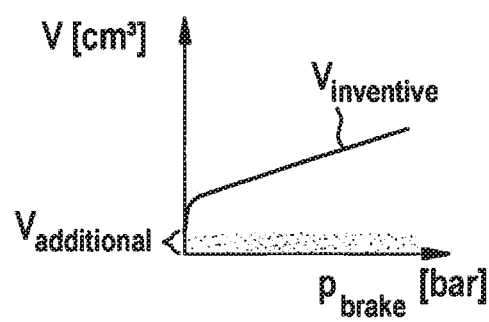
Figure 4C:
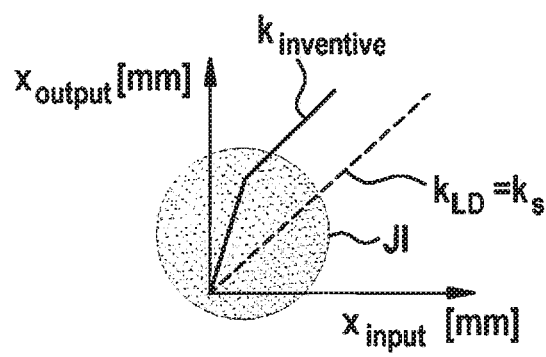

FIGS. 4a to 4c show coordinate systems to explain an embodiment of the method for operating an electromechanical brake booster of a vehicle.

In the coordinate system of FIG. 4a, the abscissa indicates an input rod travel $x_{input}$ (in millimeters) of an input rod of the electromechanical brake booster, while the ordinate reproduces a brake master cylinder pressure $t_{tmc}$ (in bars) in a brake master cylinder downstream from the electromechanical brake booster. The abscissa of the coordinate system of FIG. 4b indicates a brake pressure $p_{brake}$ (in bars) in the wheel brake cylinders of a hydraulic braking system interacting with the electromechanical brake booster, the brake fluid volume V (in cm$^3$) to be displaced for that purpose out of the brake master cylinder into the wheel brake cylinders being indicated by the ordinate of the coordinate system of FIG. 4b. With the coordinate system of FIG. 4c as well, the abscissa indicates the input rod travel $x_{input}$ (in millimeters), while the ordinate indicates an output rod travel $x_{output}$ (in millimeters) of an output rod of the electromechanical brake booster.

At the beginning of the method, an actuation of a brake pedal of the vehicle or motor vehicle by its driver is detected. An electric motor of the electromechanical brake booster is immediately controlled, in consideration at least of the detected actuation of the brake pedal, in such a way that the output piston, connected indirectly to the electric motor, is displaced out of its initial position by the controlled electric motor. The electric motor is controlled so as to displace the output piston in such a way that a frictional engagement between the output piston and the input piston exists only once the output piston has been displaced out of its initial position by at least a predefined limit displacement travel (or until the input piston, indirectly connected to the brake pedal and displaced by way of the actuation of the brake pedal, has been displaced over a corresponding jump-in region Δ). The electric motor is furthermore controlled in such a way that, during the displacement of the output piston out of its initial position as far as the limit displacement travel, a speed $v_{output}$ of the output piston starting from a reference speed predefined by way of a pedal speed of the brake pedal (or by way of a speed of a piston rod) is increased to a predefined or specified maximum speed, and the speed of the output piston is reduced from the maximum speed to the reference speed while the output piston is still being displaced out of its initial position to the limit displacement travel. This is depicted in FIG. 4c, the pedal travel characteristic curves $k_s$ and $k_{LD}$ of the existing art also being plotted in FIG. 4c in addition to the pedal characteristic curve $k_{inventive}$ brought about by way of the method described here.

What is obtained by way of the method described here is a ratio $p_{inventive}$, between the actuated input rod travel $x_{input}$ and the brake master cylinder pressure $p_{tmc}$ brought about thereby, which is equal to the ratio $p_s$ between the actuated input rod travel $x_{input}$ and the brake master cylinder pressure $p_{tmc}$ of the conventional floating caliper wheel brake cylinder brought about thereby. In addition, upon execution of the method described here, a time interval within which the speed of the output piston, displaced out of its initial position by less than the limit displacement travel, is firstly increased from the reference speed to the maximum speed and then reduced from the maximum speed to the reference speed, is adhered to in such a way by way of the effected elevation of the speed above the reference speed, a brake fluid volume $V_{additional}$ which is sufficient to close air gaps of all four wheel brake cylinders of the hydraulic braking system is additionally displaced out of the brake master cylinder into the wheel brake cylinders. This is depicted in FIG. 4b by the ratio $V_{inventive}$ between the brake pressure $p_{brake}$ in the floating caliper wheel brake cylinder and the brake fluid volume V to be introduced thereinto for that purpose. The "additional displacement" of the brake fluid volume $V_{additional}$ sufficient for closing the air gaps of all four wheel brake cylinders occurs automatically by the fact that the output piston is displaced over an increased output rod travel $x_{output}$ even before the jump-in region JI has been traversed.

Be it noted that a range of embodiment of the method described here is not limited to a specific brake system type of the hydraulic braking system. The method described here can be used with all types of vehicle or motor vehicle, such that for all types of vehicle or motor vehicle, the driver experiences faster response of the brakes for a given actuation. In particular, the driver of a vehicle or motor vehicle equipped with low drag wheel brake cylinders experiences the same brake response as when standard brake calipers are used.

Optionally, the maximum speed can be specified at least in consideration of a current speed of the vehicle. The maximum speed can likewise be specified at least in consideration of a braking dynamics variable regarding a dynamics of the actuation of the brake pedal by the driver.

What is claimed is:

1. A control apparatus for an electromechanical brake booster of a vehicle, comprising:
    an electronic device to control an electric motor of the electromechanical brake booster, based on a furnished braking definition signal relating to an actuation of a brake pedal of the vehicle by a driver, such that an output piston, connected indirectly to the electric motor, of the electromechanical brake booster is displaceable out of an initial position by the controlled electric motor, wherein the electronic device is configured to control the electric motor so that it is only after a displacement of the output piston out of the initial position by at least a predefined limit displacement travel that a frictional engagement exists between the output piston and an input piston that is indirectly connected to the brake pedal, the input piston being displaced by the actuation of the brake pedal;
    wherein the electronic device is further configured to control the electric motor, during a displacement of the output piston out of the initial position to the limit displacement travel, so that a speed of the output piston displaced out of the initial position by less than the limit displacement travel is at first increased from a reference speed predefined by a pedal speed of the brake pedal to a predefined maximum speed, and is then reduced from the maximum speed to the reference speed.

2. The control apparatus of claim 1, wherein the electronic device is further configured to specify the maximum speed at least in consideration of a furnished vehicle speed signal relating to a current speed of the vehicle.

3. The control apparatus of claim 1, wherein the electronic device is further configured to specify the maximum speed based on a braking dynamics signal relating to a dynamics of the actuation of the brake pedal by the driver.

4. An electromechanical brake booster for a vehicle, which is placeable or placed upstream from a brake master cylinder of a hydraulic braking system, comprising:
    a control apparatus, including:
        an electronic device to control an electric motor of the electromechanical brake booster, based on a furnished braking definition signal relating to an actuation of a brake pedal of the vehicle by a driver, such that an output piston, connected indirectly to the electric motor, of the electromechanical brake booster is displaceable out of an initial position by the controlled electric motor, wherein the electronic device is configured to control the electric motor so that it is only after a displacement of the output piston out of the initial position by at least a predefined limit displacement travel that a frictional engagement exists between the output piston and an input piston that is indirectly connected to the brake pedal, the input piston being displaced by the actuation of the brake pedal;
    wherein the electronic device is further configured to control the electric motor, during a displacement of the output piston out of the initial position to the limit displacement travel, so that a speed of the output piston displaced out of the initial position by less than the limit displacement travel is at first increased from a reference speed predefined by a pedal speed of the brake pedal to a predefined maximum speed, and is then reduced from the maximum speed to the reference speed.

5. A hydraulic braking system for a vehicle, comprising an electromechanical brake booster, which is placeable or placed upstream from a brake master cylinder of the hydraulic braking system, including a control apparatus, including:
    an electronic device to control an electric motor of the electromechanical brake booster, based on a furnished braking definition signal relating to an actuation of a brake pedal of the vehicle by a driver, such that an output piston, connected indirectly to the electric motor, of the electromechanical brake booster is displaceable out of an initial position by the controlled electric motor, wherein the electronic device is configured to control the electric motor so that it is only after a displacement of the output piston out of the initial position by at least a predefined limit displacement travel that a frictional engagement exists between the output piston and an input piston that is indirectly connected to the brake pedal, the input piston being displaced by the actuation of the brake pedal;
    wherein the electronic device is further configured to control the electric motor, during a displacement of the output piston out of the initial position to the limit displacement travel, so that a speed of the output piston displaced out of the initial position by less than the limit displacement travel is at first increased from a reference speed predefined by a pedal speed of the brake pedal to a predefined maximum speed, and is then reduced from the maximum speed to the reference speed; wherein the respective electromechanical brake booster is placed upstream from a brake master cylinder of the hydraulic braking system.

6. The hydraulic braking system of claim 5, further comprising:
    four wheel brake cylinders, a time interval within which the speed of the output piston, displaced out of the initial position by less than the limit displacement travel, is firstly increased from the reference speed to the maximum speed and then reduced from the maximum speed to the reference speed, being specified so that a brake fluid volume additionally displaced out of the brake master cylinder into the wheel brake cylinders as a result of the effected elevation of the speed above the reference speed is sufficient to close the air gaps of the four wheel brake cylinders.

7. The hydraulic braking system of claim 6, wherein the four wheel brake cylinders each include a reduced-resistance brake caliper.

8. A method for operating an electromechanical brake booster of a vehicle, the method comprising:
- detecting an actuation of a brake pedal of the vehicle by the driver thereof; and
- controlling an electric motor of an electromechanical brake booster, based on the detected actuation of the brake pedal, so that an output piston, connected indirectly to the electric motor, of the electromechanical brake booster becomes displaced out of an initial position by the controlled electric motor;
- the electric motor being controlled to displace the output piston so that it is only after a displacement of the output piston out of the initial position by at least a predefined limit displacement travel that a frictional engagement exists between the output piston and an input piston that is indirectly connected to the brake pedal, the input piston being displaced by the actuation of the brake pedal,
- wherein the electric motor is controlled, during the displacement of the output piston out of the initial position to the limit displacement travel, to increase a speed of the output piston from a reference speed predefined by a pedal speed of the brake pedal to a predefined maximum speed and, while the output piston is still being displaced out of the initial position to the limit displacement travel, to reduce the speed of the output piston from the maximum speed to the reference speed.

9. The method of claim 8, wherein the maximum speed is specified based on a current speed of the vehicle.

10. The method of claim 8, wherein the maximum speed is specified based on a braking dynamics variable relating to a dynamics of the actuation of the brake pedal by the driver.

11. The method of claim 8, wherein the operated electromechanical brake booster is placed upstream from a brake master cylinder of a hydraulic braking system of the vehicle, and a time interval within which the speed of the output piston, displaced out of the initial position by less than the limit displacement travel, is firstly increased from the reference speed to the maximum speed and then reduced from the maximum speed to the reference speed, being adhered to by the effected elevation of the speed above the reference speed, a brake fluid volume which is sufficient to close air gaps of all four wheel brake cylinders of the hydraulic braking system is additionally displaced out of the brake master cylinder into the wheel brake cylinders.

\* \* \* \* \*